United States Patent [19]

Ersoy

[11] 4,109,996
[45] Aug. 29, 1978

[54] METHOD FOR PRODUCING A SYNTHETIC HOLOGRAM

[75] Inventor: Kadri Okan Ersoy, Li, Norway

[73] Assignee: Sentralinstitutt for Industriell Forskning, Oslo, Norway

[21] Appl. No.: 692,576

[22] Filed: Jun. 3, 1976

[30] Foreign Application Priority Data

Jun. 3, 1975 [NO] Norway ................... 751942

[51] Int. Cl.² .............................................. G02B 27/00
[52] U.S. Cl. ..................................................... 350/3.66
[58] Field of Search ......................................... 350/3.5

[56] References Cited

U.S. PATENT DOCUMENTS

| | | | |
|---|---|---|---|
| 3,518,367 | 6/1970 | Smith | 350/3.5 X |
| 3,606,515 | 9/1971 | Hirsch et al. | 350/3.5 |
| 3,606,516 | 9/1971 | Hirsch et al. | 350/3.5 |
| 3,717,412 | 2/1973 | Takuma et al. | 350/3.5 X |

OTHER PUBLICATIONS

Lesem et al., "Computer Synthesis of Holograms", *Commun. of ACM*, vol. 11, No. 10, Oct. 1968, pp. 661–674.
Ransom, "Synthesis of Complex Optical Wavefront," *Applied Optics*, vol. 11, No. 11, Nov. 1972, pp. 2554–2560.
Chu, "Recent Approaches to Computer-Generated Holograms," *Optical Engineering*, vol. 13, No. 3, May–Jun. 1974, pp. 189–195.
Ersoy, "Lucite as a Recording Material in Sem Holography," *Applied Optics*, vol. 14, No. 1, Jan. 1975, pp. 21–22.

*Primary Examiner*—John K. Corbin
*Assistant Examiner*—John D. Lee
*Attorney, Agent, or Firm*—Wenderoth, Lind & Ponack

[57] ABSTRACT

Method of producing a synthetic hologram from a wavefront being defined by geometrical points in space and by the phase and amplitude of the points, by computer calculation of quantized hologram areas, wherein each point and its hologram areas are considered separately during the calculation, whereafter the hologram areas of the points are generated for producing the hologram. The hologram areas of each point are considered in relation to the defined phase and amplitude of the point, determining for the phase the position of the hologram areas of the point by adjusting the length of radius vector from the point to each associated hologram area by using the phase in this point and the phase of a reference wave on the hologram area, and determining for the amplitude a number of areas for the point such that this number is proportional to the amplitude in the point.

2 Claims, 4 Drawing Figures

METHOD FOR PRODUCING A SYNTHETIC HOLOGRAM

This invention relates to a method for producing a synthetic hologram from a wavefront being defined by geometrical points in space and by the phase and amplitude of the points.

BACKGROUND OF THE INVENTION

Since holography was first described by D. Gabor—A New Microscope Principle, Nature, V.161 (1948), p. 777—the development within this field has proceeded quickly, in particular following the introduction of the laser for reconstruction, see E. N. Leith and J. Upatnieks: Reconstructed Wavefronts and Communication Theory, J. Optical Society of America, V. 53 (1963), p. 1377. This development from what may be called classical holography to digital holography for producing synthetic holograms—T. S. Huang: Digital Holography, Proc. of the IEEE, V. 59 (1971) no. 9—has made it possible to look at three-dimensional representations of objects which have been described mathematically, but which do not exist.

Within classical holography a wave coming from a real object is combined with a reference wave, and the sum of these waves is recorded on a modulator for a reconstruction wave. By directing the reconstruction wave against the hologram thus produced, the object is reconstructed. In the computer generation of holograms the combination of an imaginary wave from the mathematically described object and an imaginary reference wave is calculated mathematically, such that the imaginary total wavefront is calculated in quantized areas in the plane in which the hologram is located during reconstruction. This involves the calculation of amplitude and phase for the total wave field. In optical holography a calculated wave information is usually recorded by plotting the interference pattern between the two light waves at a practical scale as an artwork which is then scaled down photographically. The present invention comprises the direct generation of quantized hologram areas, for instance by means of a scanning electron microscope.

Several methods have been developed for recording amplitude and phase information for a light wave front. In the Lohmann's technique the hologram generated is binary, thus it consists of opaque and transparent windows. The size of a transparent window is then proportional to the desired amplitude, and its position is related to the desired phase. In Lee's technique the complex wave information is decomposed into four real parts displaced from each other, so that both the real and the imaginary parts of the desired information are recorded. In both these techniques the object points considered to be emitting light against the hologram plane, must be on a plane or a collection of planes located in the Fraunhofer region, so that the fast fourier transform (FFT) can be used to calculate the light wave amplitude and phase at quantized apertures in the hologram plane. In Waters' technique the individual object points as well as the hologram due to each of these points are considered separately. In other words the zone plate pattern is recorded. In such case the object points can be in the Fresnel region. In the kinoform technique the amplitude of the light wave is assumed to be constant, and only the phase is recorded, which will be approximately correct for objects giving diffuse reflection. The phase information can be recorded by means of binary selection, such that when the phase is between 0 and $\pi$ radians, a window is made on the hologram, and when the phase is between $\pi$ and $2\pi$ radians, no record is made.

Generally one of the big problems in connection with computer generation of holograms is that the time for computing the interference pattern between the object wave and the reference wave may be so long that the generation excludes itself. Even the simplified methods used are complicated and time consuming. With respect to the kinoform technique in particular there must be used a gray scale in order to simulate the actual phase angle. In a sampled representation of the object and binary quantization also conjugate and higher order images are created.

SUMMARY OF THE INVENTION

The purpose of the present invention is to provide a simpler method for producing synthetic holograms.

This has been made possible among others by employing a scanning electron microscope, a controlled laser beam or other equipment which can plot with sufficient accuracy for exposing a modulator. In this connection it has been observed that the hologram areas essentially are sources of point diffraction. Moreover, it has been observed that bombardment of the modulator causes phase alteration of an incoming light field.

During operation of the above equipment it has been determined that the amplitude of the light field at any point on an object or in a light wave-front during diffraction is proportional to the number of hologram areas being exposed, and the size thereof. Moreover, it has been found that the phase of the light field from the object point is determined by the distance between the object point and the center of the exposed area in the photosensitive material. These observations have general validity to the extent it is known that holography can be employed for other waves than light.

On this background this invention has provided a simple method for producing synthetic holograms, this method being characterized in that the hologram areas of each point are considered in relation to the defined phase and amplitude of the point, determining for the phase the positions of the hologram areas of the point by adjusting the length of the radius vector from the point to each associated hologram area by using the phase in this point and the phase of a reference wave on the hologram area, and determining for the amplitude a number of areas for the point such that this number is proportional to the amplitude in the point.

By varying the number of hologram areas employed, amplitude modulation thus can be obtained very accurately. The determination of any phase is made by adjusting the length of the radius vector from the object point to the center of the exposed hologram area. This is done by selecting initially a hologram area position, which is preferably done in an arbitrary way since any correlation between the hologram areas which are not used for reconstructing a point, leads to noise and/or undesired images. Then the length of the radius vector between the point and the hologram areas is calculated. The positions of these areas are then somewhat altered in horizontal or vertical direction, or in a specified direction, so as to adjust the length of the radius vector accurately to give the desired phase.

This method has made it possible to substantially simplify the mathematical calculation of the wavefront. When the necessary means are available, the method besides will make possible the production of synthetic volume holograms, since an arbitrary choice of hologram area position and alteration thereof in a horizontal, a vertical or a specified direction permits hologram point generation in three-dimensional modulators.

BRIEF DESCRIPTION OF THE DRAWINGS

The invention shall now be explained more closely by means of an example. Reference is made to the drawing in which.

DETAILED DESCRIPTION OF THE INVENTION

Figure 1:
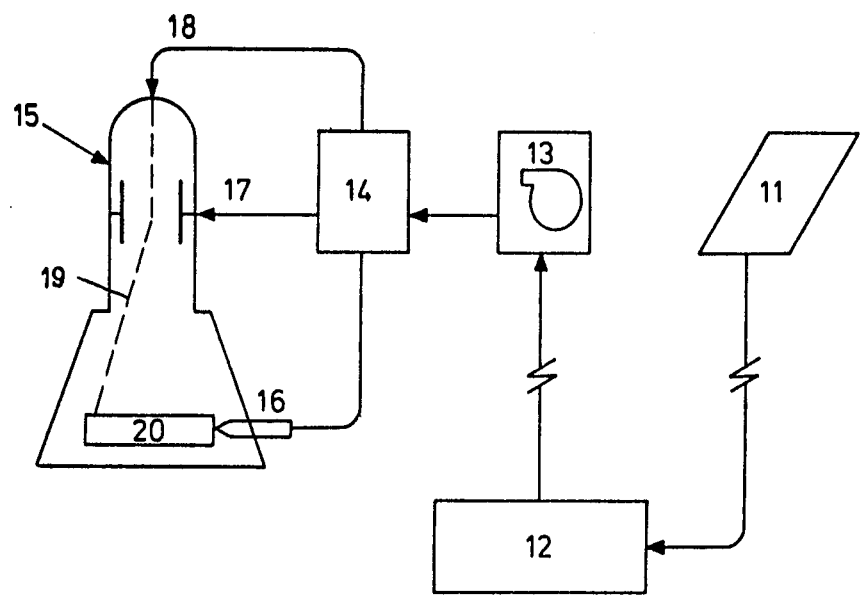
FIG. 1 is a previously known illustration of the principle for generating synthetic holograms by means of a scanning electron microscope which is used for carrying out this invention.

In FIG. 1 reference numeral 11 designates geometrical data which mathematically and in numerical form describe the coordinates of a number of object points. These numerical data are stored in the memory of a large computer 12 which carries out the calculation of the wavefront from the object according to some suitable, but often complicated mathematical technique, as well as the interference pattern between the calculated object wavefront and a reference wave. The result is supplied to a magnetic tape station 13 for a small computer 14 which controls a scanning electron microscope 15 by controlling the line shift 16, the deflection 17 and the intensity 18 of the electron beam 19, which thereby exposes a modulator 20 in accordance with the calculated result. After exposure and possible subsequent treatment the modulator constitutes the hologram. The object can then be viewed by illuminating the hologram with a laser. The computer 12 and the magnetic tape station 13 in the present case can be eliminated by using a computer 14 which also carries out the calculations.

Figure 2:
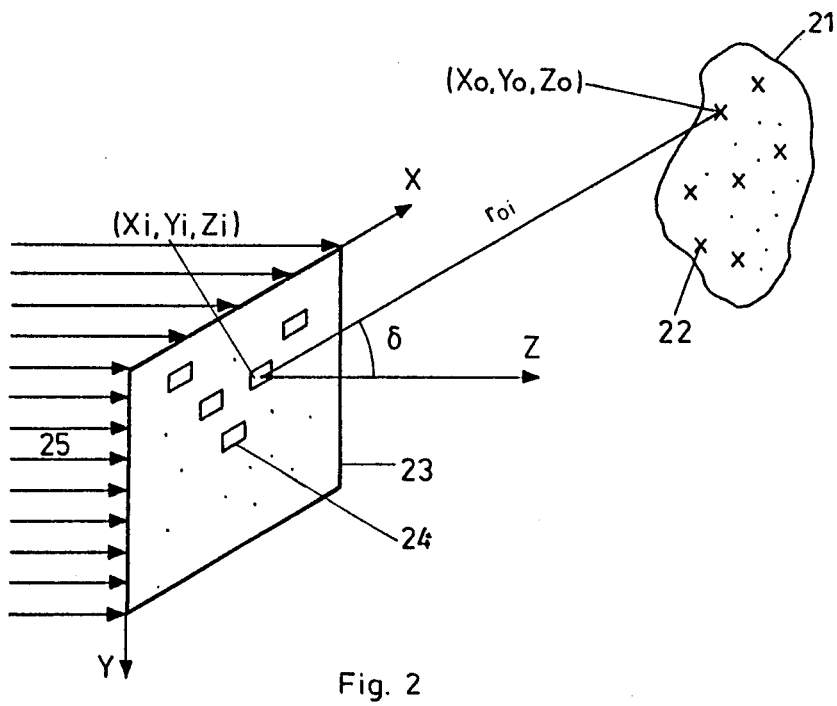
FIG. 2 shows a geometrical configuration illustrating the invention, and which is also used as a starting point for the mathematical consideration.

In FIG. 2 there is shown an object 21 and a number of geometrically defined object points 22 which describe the object 21 mathematically for the computer 12 in FIG. 1. The object 21 can also be a sampled wavefront. The positions of the object points 22 in space are chosen as desired provided that they are not outside the diffraction limited zone. One of these points 22 has been given the coordinates $(x_o, y_o, z_o)$. The hologram to be produced is here an optical planar hologram considered to be located in the plane $xy$, and the extent of the hologram is indicated by rectangle 23 which may have a size of 2 × 2 mm. Within this rectangle there may be provided as much as 4096 × 4096 areas or apertures 24 having a transverse dimension down to about 1 micron. Although the areas are shown quadratic here, they may also be circular for example. The positions of these areas in the hologram plane are calculated by means of the mathematical equations being shown below. The number of areas for each object point is chosen to be proportional to the light wave amplitude which is desired in this object point, as mentioned above. As an example can be mentioned that with 10 object points having amplitudes in the ratio of 10, 9, 8, 7, 6, 5, 4, 3, 2, 1, the number of areas for each point is chosen to be 100 000, 90 000, 80 000, 70 000, 60 000, 50 000, 40 000, 30 000, 20 000 and 10 000, respectively. Moreover, the phase is determined by locating the areas arbitrarily and then afterwards shifting them and thus adjusting the distances as described above. One of the areas has been given the coordinates $(x_i, y_i, z_i)$ and has a radius vector length of $r_{oi}$ from the point $(x_o, y_o, z_o)$. Letter $\delta$ indicates the angle between the vector $r_{oi}$ from the center of the area $(x_i, y_i, z_i)$ to the object point $(x_o, y_o, z_o)$ and the normal to the area $(x_i, y_i, z_i)$. The arrow 25 indicates an incident laser beam of wave length $\lambda$.

Thus when $(x_o, y_o, z_o)$ is considered as the observation point, and $(x_i, y_i, z_i)$ is the position of a phase-shifting area or aperture, the mathematical development of the present method in the general case can be based upon the Huygens-Fresnel principle for a collection of N apertures on a plane $z = o$ (see Introduction to Fourier Optics, T. W. Goodman, McGraw Hill, San Fransisco, 1968). This leads to:

$$U(x_o,y_o,z_o) = \sum_{i}^{N} \int\int U(x_i,y_i,z_i)h dx_i dy_i \quad (1)$$

in which $U(x,y,z)$ is the light field and $$h = \frac{1}{j\lambda} \frac{e^{jkr_{oi}}}{r_{oi}} \cos \delta \quad (2)$$

in which $k$ is the wave number, $k = 2\pi/\lambda$, and $\lambda$ is the wave length.

Since the hologram dimensions concerned are small compared to the distance from the object, $\delta$ can be assumed to be constant. If the area or aperture dimensions are also very small compared to the variations of the incoming wave, equation (1) can be written with approximation as:

$$U(x_o,y_o,z_o) = \frac{U(x_o,y_o,z_o,\theta) \cos \delta}{j\lambda} \sum_{i=1}^{N} \int\int_A \frac{e^{jkr_{oi}}}{r_{oi}} dx_i dy_i \quad (3)$$

where $\theta$ is the phase shift due to the area. This equation is rigorous if the incoming wave during reconstruction is planar and perpendicular.

Since each aperture or area is made up of a number of point diffracting sources and here has been chosen to be rectangular in the $x$-$y$ plane with dimensions $d_x$ and $d_y$, and since the area has a central point $(x_{ci}, y_{ci}, o)$ whose radial distance from the observation point is $r_{oi}$, given by $$kr_{oi} = 2\pi n + \phi_i \text{ where } n \text{ is an integer} \quad (4)$$

equation (3) by using Fraunhofer approximation can be written as:

$$U(x_o,y_o,z_o) = \frac{U(x_o,y_o,z_o,\theta)}{j\lambda R} d_x d_y \cos \delta \sum_{i=1}^{N} e^{j\phi_i} \text{sinc} \frac{X_i d_x}{\lambda r_{oi}} \text{sinc} \frac{Y_i d_y}{\lambda r_{oi}} \quad (5)$$

where
$X_i = x_o - x_{ci}$
$Y_i = y_o - y_{ci}$
$R = $ the average value of $r_{oi}$.

If all phase shifts $\phi_i$ are made equal, and $x_i, y_i < r_{oi}$, the sinc functions can be replaced by 1, so that:

$$U(x_o,y_o,z_o) = [\frac{U(x_o,y_o,z_o,\theta)}{j\lambda R}\cos \delta] d_x d_y N e^{j\phi} \qquad (7)$$

Thus the amplitude of the field will be proportional to $d_x d_y N$, and its phase will be $\phi$. If there are groups of such areas that satisfy equation (7) at different points in space, there is created a sampled wavefront with a certain amplitude and phase at each point. Note that the modulation of equation (7) is very simple, as $d_x$ and/or $d_y$ and/or $N$ can be varied for the amplitude and $\phi$ for the phase. The fact that $N$ is normally a large number, means that the number of areas can be varied almost continuously so that amplitude modulation can be achieved very accurately.

If the apertures or areas are circular, the sinc functions are replaced by a first order Bessel function, but equation (7) essentially remains the same.

If the amplitude of all the object points to be generated in space is constant, and their phases are zero, the conditions for generation simply become:

$$r_{oi} = n\lambda \text{ where } n \text{ is an integer.} \qquad (8)$$

If the phase at an object point is $\phi$ radians, equation (8) is transformed to:

$$r_{oi} = n\lambda + \phi\lambda/2\pi. \qquad (9)$$

If the amplitudes of the object points vary, the number of areas for each object point has to be proportional to the amplitude of the object point.

As mentioned above each area in the hologram plane is, when producing a planar hologram, chosen randomly and is then moved slightly in the x- and/or y-direction so that its center coordinates satisfy equation (8) or (9). If overlapping of areas is considered negligible, there is no need for memory. The hologram points generated in this fashion by means of a digital computer can be stored in a magnetic tape and can then be used to drive for example a scanning electron microscope by means of a small computer as described with reference to FIG. 1, in order to expose the modulator in the calculated positions, for instance a modulator of the type described by O. Ersoy: A Study of Electron Beam Exposure of Positive Resists, Optik, January 1975, p. 479.

According to what is said above no use has been made of a reference beam because the wave to the hologram was assumed to be plane perpendicular. However, any type of reference wave can easily be incorporated if desired. When producing volume holograms according to the above described method, the reference wave must of course be incorporated. In the general case equation (9) is modified to:

$$r_{oi} = n\lambda + (\phi - \phi_R) \lambda/2\pi \qquad (10)$$

where $\phi_R$ is the phase of the reference wave in the center of each hologram area.

By means of the method described there is produced optical planar holograms with a 30kV JEOL scanning electron microscope controlled by a Kongsberg SM 402-S mini-computer. The working area for continuous exposure was 2 × 2 mm. Although the size of this area can be increased to 7.5 × 7.5 cm by means of stepping motors, this is not recommendable for a single hologram because of an uncertainty of ± 5μm in positioning. The larger size area can, however, advantageously be used for reproducing so that the viewing window and intensity of the image are larger. The number of areas with the smallest possible transverse dimension of about 1 μm was 4096 × 4096. The size of each area can be increased by exposing adjacent areas which overlap from center to center. In the experiments performed there was used an electron sensitive material as described by O. Ersoy, B. Spjelkavik, K. Løvass, Applied Optics, January 1975.

In the following examples the mathematical calculations were carried out on the basis of a He-Ne laser having a wave length $\lambda = 0.6328$ μm.

Figure 3:
FIG. 3 shows a two-dimensional object which is reconstructed with a hologram produced with the method according to this invention.

In connection with FIG. 3, 11 points were chosen on a line being 3 cm long, so that $x = 4$ cm, $z = 60$ cm and $o < y < 3$ cm and with the origin of the coordinate axis in the upper left corner of the hologram. The number of areas used was 120 000, and each area had a size of 8 × 8 adjacent areas. The object points were made of equal light intensity.

The picture shown was taken at approximately 60 cm from the hologram, namely in the focal plane. The main light beam was blocked in order not to overexpose the film. Both the real and the conjugate images can be seen, as well as the blocking of laser light. The pictures are less than 3 cm long because of the reduction with the Polaroid camera used. When measuring the length of the line, the distance from the hologram plane to the image could easily be found.

Figure 4:
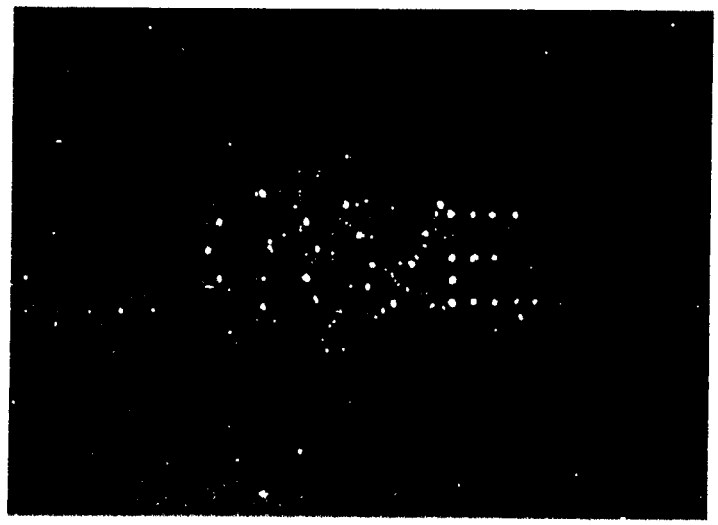
FIG. 4 shows a three-dimensional object which is reconstructed with a hologram produced with this method.

FIG. 4 has been included to show the three-dimensional effect. Each of the four letters in the word LOVE was chosen on a different plane. The distances of each of the planes from the hologram plane were 60 cm, 70 cm, 80 cm and 90 cm, respectively. If all letters were on a single plane, the distance between them would be 1 cm. In the picture it is seen that this distance is decreasing from the first to the last letter because of the depth effect. The picture was taken at approximately 90 cm from the hologram, namely in the focal plane of the letter E, which is the reason why E is most bright, and L is the least bright.

The number of areas used was 100,000, and each area had a size of 4 × 4 areas. the object points were made of equal intensity. The hologram was duplicated on a matrix with 4 × 4 holograms and enlarged 16 times so that it could easily be viewed by means of a laser or a mercury arc lamp. The images of the letters were clearly observed in space in their respective places.

The method described has both advantages and disadvantages when compared with known techniques, as will appear from the following evaluation.

Since each object point is considered independent of the others, the hologram will saturate after a certain number of image points due to the finite size of the hologram. Studies have indicated, however, that this number is several thousands with the equipment described and a hologram area of 2 × 2 mm. If a composite hologram is made by using stepping motors, the number of image points can be increased by a factor of 1380 to create a rather complicated image. In such case, however, the light coming from each individual hologram would be highly directed so that an additional system would be necessary to combine all the information coming from the different holograms.

The main advantages of the method are its simplicity, ease of choosing the image points in space arbitrarily rather than on a plane as in the case of Fourier techniques. Moreover, it is quite simple to perform the amplitude modulation. Besides, this method results in a high signal/noise ratio, which makes it ideal in applications that do not require many image points. Thus, for example it can replace the so-called step-and-repeat cameras being used in connection with integrated electronics. The method can also be used for mixing laser beams having different wave length, at an exact point in space, for example a 10.6 μm laser beam from a $CO_2$ laser and a 0.6328 μm laser beam from a He-Ne laser can be mixed.

Another interesting possibility afforded by this method, is, however, that object points with desired phase and amplitude can be created. This can be very important in connection with optical filtering and information processing where it is desired to re-combine a certain number of object points in one part of space to give some desired image in another part of space.

I claim:

1. A method for directing a recording device to produce a synthetic hologram comprised of a plurality of quantized hologram spots in a modulating medium, said quantized hologram spots representing points on a wavefront defined by a plurality of geometrical points in space, said method comprising:

selecting a point of said wavefront to be represented in said modulating medium;

arbitrarily selecting positions for a number of quantized hologram spots allocated for the selected point of said wavefront to be represented in said hologram;

determining the number of hologram spots for the selected point to be proportional to the wave amplitude at the point;

adjusting the arbitrarily selected position of each of said hologram spots such that the length of the radius vector from the selected point to the center of the spot in its adjusted position satisfies the equation:

$$r_{oi} = n\lambda + (\phi - \phi_R)(\lambda/2\pi)$$

in which $r_{oi}$ is the radius vector length $n$ is an integer $\phi$ is the phase at the geometrical point, $\phi_R$ is the phase of the reference wave at the center of said hologram spot, and $\lambda$ is the wavelength; and driving said recording device to expose said modulating medium according to the determined number of hologram spots and the adjusted positions thereof.

2. A method as claimed in claim 1 wherein said recording device is a scanning electron microscope and said modulating medium is a hologram modulator.

* * * * *